United States Patent [19]

Funakoshi et al.

[11] Patent Number: 6,036,939
[45] Date of Patent: Mar. 14, 2000

[54] HEAT-RESISTANT LOW-SILICA ZEOLITE, AND PROCESS FOR PRODUCTION AND APPLICATION THEREOF

[75] Inventors: Hajime Funakoshi; Yoshinori Shirakura; Shunsuke Yatsunami, all of Shinnanyo; Kazuaki Yamamoto, Tokuyama; Nobuhiro Ogawa, Ichikawa; Takashi Mori, Hikari; Atsushi Harada, Shinnanyo, all of Japan

[73] Assignee: Tosoh Corporation, Japan

[21] Appl. No.: 08/919,163

[22] Filed: Aug. 28, 1997

[30] Foreign Application Priority Data

Aug. 30, 1996 [JP] Japan .................... 8-229676
Nov. 29, 1996 [JP] Japan .................... 8-319619
Mar. 10, 1997 [JP] Japan .................... 9-054710

[51] Int. Cl.⁷ ............................ C01B 39/22; B01L 20/18; B01J 53/047
[52] U.S. Cl. ................ 423/710; 423/711; 423/DIG. 21; 502/79; 95/96; 95/130
[58] Field of Search ..................... 423/700, 410, 423/711, DIG. 21; 502/79; 95/96, 130

[56] References Cited

U.S. PATENT DOCUMENTS

| | | |
|---|---|---|
| 3,767,771 | 10/1973 | Guth et al. . |
| 4,481,018 | 11/1984 | Coe et al. . |
| 4,606,899 | 8/1986 | Butter et al. ............... 423/DIG. 21 |
| 4,661,334 | 4/1987 | Latourrette et al. ........... 423/710 |
| 4,859,217 | 8/1989 | Chao . |
| 5,268,023 | 12/1993 | Kirner . |
| 5,366,720 | 11/1994 | Caglione et al. . |
| 5,417,957 | 5/1995 | Coe et al. ................. 423/DIG. 21 |
| 5,464,467 | 11/1995 | Fitch et al. ............... 423/DIG. 21 |
| 5,868,818 | 2/1999 | Ogawa et al. ............... 423/DIG. 21 |
| 5,908,823 | 6/1999 | Zatta et al. ............... 423/DIG. 21 |
| 5,928,623 | 7/1999 | Plee et al. ................. 423/700 |

FOREIGN PATENT DOCUMENTS

| | | |
|---|---|---|
| 2 105 451 | 4/1972 | France . |
| 35-7047713 | 3/1982 | Japan . |
| 1580928 | 12/1980 | United Kingdom . |
| WO 96/02462 | 2/1996 | WIPO . |

OTHER PUBLICATIONS

Kühl, Zeolites, 1987, vol. 7 Sep. pp. 451–457 Crystallization of low–silica faujasite ($SiO_2/Al_2O_3\sim2.0$).

*Primary Examiner*—Mark L. Bell
*Assistant Examiner*—David Sample
*Attorney, Agent, or Firm*—Nixon & Vanderhye

[57] ABSTRACT

A novel heat-resistant low-silica zeolite, an industrial production process, and uses of the low-silica zeolite are provided. The heat-resistant low-silica zeolite contains Si and Al in a molar ratio of $SiO_2/Al_2O_3$ ranging from 1.9 to 2.1, and has sodium and/or potassium as metal cation, wherein the low-silica zeolite contains low-silica faujasite type zeolite at a content of not lower than 88%, and has a thermal decomposition temperature ranging from 870° C. to 900° C. in the air. The process for producing the heat-resistant low-silica zeolite comprises mixing a solution containing an aluminate with another solution containing a silicate, allowing the resulting mixture to gel, and aging the resulting gel, at the temperature of from 0° C. to 60° C., to prepare a slurry having a viscosity ranging from 10 to 10000 cp and containing amorphous aluminosilicate having a specific surface area of not less than 10 m²/g with an $SiO_2/Al_2O_3$ molar ratio ranging from 1.9 to 2.1; and subsequently crystallizing the aluminosilicate. The low-silica zeolite ion-exchanged with lithium or an alkaline earth metal is useful for gas separation.

10 Claims, No Drawings

HEAT-RESISTANT LOW-SILICA ZEOLITE, AND PROCESS FOR PRODUCTION AND APPLICATION THEREOF

BACKGROUND OF THE INVENTION

1. Field of the Invention

The present invention relates to a novel low-silica zeolite of an $SiO_2/Al_2O_3$ molar ratio of 1.9–2.1 having extraordinary high heat resistance. The present invention relates also to a process for industrial production, and application fields thereof.

The novel low-silica zeolite of an $SiO_2/Al_2O_3$ molar ratio of 1.9–2.1 having extraordinary high heat resistance retains the high heat resistance even after ion-exchange with various ions. This low-silica zeolite exhibits extremely high performance, for example, as an adsorption zeolite in separating and concentrating oxygen from an oxygen-nitrogen gas mixture by adsorption, or as a $CO_2$ adsorbent.

2. Description of the Related Art

The low-silica zeolite of an $SiO_2/Al_2O_3$ molar ratio of 1.9–2.1 (hereinafter referred to as "LSX") is known to exhibit high performance as an adsorbent base material for oxygen production, or an adsorbent for $CO_2$ gas.

However, no technique has been established for industrial production of LSX, and the adsorbent prepared by ion exchange of an LSX prepared by a known laboratory technique is inferior in heat resistance. Therefore, the LSX has not been practicalized industrially.

The performance of conventional LSX exchanged with lithium ion was evaluated in U.S. Pat. No. 3,140,933, JP-B-5-25527, and U.S. Pat. No. 5,268,023. The performance of conventional LSXs exchanged with calcium ion is shown in JP-A-61-254247, JP-A-6-23264, and U.S. Pat. No. 5,454,857.

However, the known LSXs are prepared in a small amount over several days by a laboratory synthesis technique, and the production cannot be practiced industrially. Moreover, the laboratory LSXs are not sufficient in heat resistance.

The laboratory methods for preparation of LSX of the $SiO_2/Al_2O_2$ molar ratio of 1.9–2.1 are disclosed by prior art documents as below:

GB 1,580,928 (corresponding to JP-A-53-8400) discloses a method in which a mixture containing sodium, potassium, aluminate, and silicate is crystallized at a temperature lower than 50° C., or is aged at a temperature lower than 50° C. and then crystallized at a temperature of 60–100° C. This method requires a time of 50 hours or more substantially for preparation of high-purity LSX, which is not suitable for industrial production. The resulting LSX is not satisfactory in heat resistance.

GB 1,580,928 (JP-A-53-8400) investigated in detail the method disclosed by East Germany Patent 43221. However, the resulting LSX also had low water adsorption capacity, and had a low purity.

The above patents cover wide ranges of conditions for preparation of LSX. However, the ranges include regions where LSX cannot be produced.

The inventors of GB 1,580,928 (JP-A-53-8400) presented later a scientific paper (Zeolite, 1987, Vol.7, p.451–457) to disclose the synthesis of LSX in detail. In that paper, high-purity LSX (97% or higher) was obtained by use of a sealed plastic vessel. However, heat resistance was not improved by this method. The synthesis in that document was conducted in a small scale by standing in an oven during the steps of from aging to crystallization, which is not applicable to industrial production.

U.S. Pat. No. 4,859,217 (corresponding to JP-B-5-25527) discloses a method in which a mixture containing sodium, potassium, and aluminate is mixed with another mixture containing silicate at a low temperature of 4–12° C., the mixture is allowed to gel, and the formed gel is aged at 36° C. and crystallized at an elevated temperature of 70° C.

The above patents describe that the gelation takes two to three days, and application of excessive mechanical energy should be avoided.

Even at the time (Application date of U.S. Pat. No. 4,859,217 (Jun. 30, 1987)), the synthesis of LSX takes long time without application of mechanical energy, namely stirring, and the resulting LSX itself is less heat-resistant.

Alternatively, U.S. Pat. No. 4,603,040 (corresponding to JP-A-61-222919) discloses preparation of LSX from kaolin as the alumina and silica source with stirring. In this method, however, the LSX content is no more than about 60% of all zeolite even after the reaction for 100 hours or more, with 10% or more of A-type zeolite produced as a byproduct, and the adverse effect of stirring is reconfirmed for high-purity LSX production. Moreover, the formed "macroscopic condensate" has a particle diameter exceeding 50 μm. Therefore, the resulting LSX, after ion exchange, does not give sufficient nitrogen adsorption capacity when it is used for nitrogen adsorption from air in high-purity oxygen production by a pressure-swing adsorption (hereinafter referred to as "PSA"), being not suitable as the base low-silica zeolite for PSA gas separation. The LSX is not useful also for $CO_2$ gas adsorption for the same reason.

At the moment, the low-silica zeolite (LSX) is believed to be producible only by reaction for a long time with still-standing. No disclosure is found on industrial process for LSX, and improvement of the heat resistance of the industrial LSX. The high performance of the adsorbent employing the LSX as the base zeolite is confirmed in laboratory only, and has not been realized industrially.

On the other hand, industrial production of oxygen by the PSA process is practiced in iron production with a blast furnace, glass production in a fusion furnace, bleaching, fermentation, and so forth by use of an adsorbent in an amount of from tons to several tens of tons in one batch. Therefore, the term "industrial production" herein means production of several tons or more of zeolite in one batch, not production in several kilograms.

Known LSX-based adsorbents are produced by ion exchange of LSX with lithium cation; alkaline earth metal cation such as calcium cation and strontium cation; or composite cation of lithium cation with another cation such as alkaline earth metal cation. They are produced in a laboratory, and is not heat-resistant (e.g., U.S. Pat. No. 5,152,813).

U.S. Pat. No. 3,140,923 discloses that faujasite exchanged with lithium ion exhibits high performance in nitrogen adsorption, higher at a higher lithium ion exchange ratio, and the faujasites of an $SiO_2/Al_2O_3$ molar ratio of up to 2.0 are useful therefore. This USP does not mention the heat resistance of the faujasite employed.

The faujasite exchanged with lithium ion at a higher exchange ratio was evaluated further by U.S. Pat. No. 4,859,217 (corresponding to JP-B-5-25527) and U.S. Pat. No. 5,268,023, and the properties are shown in detail. However, the LSX was prepared by a conventional method in the disclosures, and was less heat-resistant.

The inventor of the above U.S. Pat. No. 4,859,217, Chien C. Chao, indicated the low heat resistance of lithium-exchanged faujasite in U.S. Pat. No. 5,174,979, and reported the improvement of the heat resistance of the faujasite by mixed ion exchange with lithium ion and alkaline earth metal ion. The faujasite obtained by exchange with mixed ions of lithium and an alkaline earth metal, although the heat resistance thereof is improved, has a poor adsorption ability, especially at a low temperature, so that the improvement of the heat resistance is of no value.

Zeolite adsorbents derived from LSX by exchange with cation of an alkaline earth metal such as calcium and strontium are disclosed in JP-A-61-254247, U.S. Pat. No. 5,173,462, U.S. Pat. No. 5,454,857, and so forth. However, they are prepared from conventional laboratory LSX as disclosed by GB 1,580,928 (corresponding to JP-A-53-8400) and other patents, and is not sufficient in heat resistance like the aforementioned lithium-exchanged one.

The LSX, having potentiality of high performance, has not been used in industrial gas separation by PSA because of difficulty in industrial LSX production and insufficient heat resistance of the conventional LSX.

SUMMARY OF THE INVENTION

The present invention intends to provide a novel LSX having high heat resistance, and a process for industrial production thereof.

According to an aspect of the present invention, there is provided a heat-resistant low-silica zeolite of a molar ratio of $SiO_2/Al_2O_3$ ranging from 1.9 to 2.1 having sodium and/or potassium as a metal cation, the low-silica zeolite containing low-silica faujasite type zeolite at a content of not lower than 88%, and has a thermal decomposition temperature ranging from 870° C. to 900° C. in the air.

According to another aspect of the present invention, there is provided a process for producing the above heat-resistant low-silica zeolite, the process comprising mixing a solution containing an aluminate with another solution containing a silicate, allowing the resulting mixture to gel, and aging the formed gel, at a temperature ranging from 0° C. to 60° C., to prepare a slurry having a viscosity ranging from 10 to 10000 cp and containing amorphous aluminosilicate having a specific surface area of not less than 10 $m^2/g$ with an $SiO_2/Al_2O_3$ molar ratio ranging from 1.9 to 2.1; and subsequently crystallizing the amorphous aluminosilicate.

According to still another aspect of the present invention, there is provided a lithium ion-exchanged low-silica zeolite for gas separation which is derived by exchanging the above heat-resistant low-silica zeolite with lithium ion at a lithium exchange ratio ranging from 75% to 100%.

According to a further aspect of the present invention, there is provided an alkaline earth metal ion-exchanged low-silica zeolite for gas separation which is derived by exchanging the above heat-resistant faujasite type low-silica zeolite with an alkaline earth metal ion at an alkaline earth metal exchange ratio ranging from 40% to 75%.

According to a still further aspect of the present invention, there is provided a use of the aforementioned low-silica zeolite for production of high purity oxygen gas, comprising adsorbing nitrogen gas from the air by pressure swing adsorption (PSA).

According to a still further aspect of the present invention, there is provided a use of the aforementioned low-silica zeolite for separation, recovery, and removal of $CO_2$ gas by adsorbing $CO_2$ from a gas by pressure swing adsorption (PSA).

DETAILED DESCRIPTION OF THE PREFERRED EMBODIMENT

After comprehensive studies on technique of industrial production of LSX, the inventors of the present invention found that a high-purity LSX can be obtained by selecting the conditions of mixing the source materials to control the viscosity of the formed gel, the BET specific surface area, and so forth, and stirring the gel during aging and temperature elevation; the LSX thus obtained is a novel substance having extraordinarily high heat resistance; the novel LSX having heat resistance can be produced industrially to meet the demand according the above process; and the cation-exchanged adsorbents, especially lithium-exchanged or alkaline earth metal-exchanged adsorbents derived from the LSX are novel and also have high heat resistance and excellent air-separation characteristics. The present invention has been accomplished based on the above findings.

The process for producing the base zeolite, LSX, or the present invention is described below.

The inventors of the present invention studied the process of synthesis of LSX of $SiO_2/Al_2O_3$ molar ratio of 1.9–2.1 under the conditions suitable for scale-up for industrial production process. As the results, it was found that an LSX can be produced, without still-standing aging, by a process comprising steps of mixing a solution containing an aluminate and another solution containing a silicate, allowing the resulting mixture to gel, and aging the formed gel with stirring for uniform fluidization, at the temperature ranging from 0° C. to 60° C., to prepare a slurry having a viscosity ranging from 10 to 10000 cp and containing amorphous aluminosilicate having a specific surface area of not less than 10 $m^2/g$ with an $SiO_2/Al_2O_3$ molar ratio ranging from 1.9 to 2.1; and subsequently crystallizing the amorphous aluminosilicate.

Further it was found that the slurry having the above properties can be synthesized readily by mixing an aqueous alkali silicate solution of an $SiO_2/(Na_2O+K_2O)$ molar ratio of lower than 1.0 with an aqueous alkali aluminate solution of an $Al_2O_3/(Na_2O+K_2O)$ molar ratio of lower than 1.0. In particular, the heat-resistant low-silica zeolite was found to be producible at the $Na_2O/(Na_2O+K_2O)$ molar ratio ranging from 0.5 to 0.75, more preferably from 0.5 to 0.65.

The $SiO_2/Al_2O_3$ molar ratio of the LSX of the present invention is theoretically 2.0. In consideration of measurement error in chemical analysis, LSX having the composition ratio in the range of from 1.9 to 2.1 naturally falls in the scope of the present invention.

The solution containing an aluminate in the present invention includes solutions of commercial sodium aluminate in water, solutions of aluminum hydroxide in a sodium hydroxide solution, and mixtures of the above solution with water, sodium hydroxide, or potassium hydroxide. The concentration of the aluminum component in the aluminate-containing solution is not higher than 30% by weight, preferably not higher than 25% by weight, but is not specially limited thereto. In the above concentration range, the aluminate-containing solution has a low viscosity, and can be mixed readily with the silicate-containing solution.

The solution containing a silicate in the present invention includes solutions of commercial #3 sodium silicate or silica sand in a sodium hydroxide, and mixtures of the above solution with water, sodium hydroxide or potassium hydroxide.

The concentration of silicon component in the silicon-containing solution is preferably not higher than 40% by weight, more preferably not higher than 30% by weight in terms of $SiO_2$, but is not limited thereto. In the above concentration range, the silicate-containing solution has a low viscosity, and can be mixed readily.

The aforementioned aluminate-containing solution and the silicate-containing solution are mixed together and the mixture is allowed to gel. The temperature of mixing is in the range of from 0° C. to 60° C., preferably from 20° C. to 60° C. The temperature of mixing herein means the temperature at the time of completion of mixing of the aluminate-containing solution with the silicate-containing solution. One of the aluminate-containing solution and the silicate-containing solution may be at a temperature outside this temperature range, provided that the temperature of the mixture falls within the range of from 0° C. to 60° C. at the end of the mixing, and the temperatures of the respective source material solutions are not limited.

At the temperature of mixing higher than 60° C., A-type zeolite or P-type zeolite are necessarily formed as the byproduct to render difficult the synthesis of a single phase LSX, whereas at the temperature ranging from 0° C. to 20° C., LSX can be produced, but the lower temperature requires use of an expensive cooling apparatus such as a refrigerator and later supply of a large amount of heat for the aging and crystallization. Therefore, the temperature practically is not lower than 20° C. The method of mixing and the order of addition of the mixing components are selected according to a conventional technique, and are not specially limited. In an example, an aluminate-containing solution is charged into a reaction vessel, and thereto a silicate-containing solution is added. Conversely, in another example, a silicate-containing solution is charged into a reaction vessel, and thereto an aluminate-containing solution is added. In a still another example, water is charged into a reaction vessel, and thereto an aluminate-containing solution and a silicate-containing solution are added concurrently. The method of mixing and the order of the mixing are not limited provided that the objects of the present invention can be achieved.

The molar composition ratios at the end of the mixing are preferably as below:

| | |
|---|---|
| $SiO_2 / Al_2O_3$ | 1.3–2.2 |
| $(Na_2O + K_2O)/SiO_2$ | 2.0–4.5 |
| $Na_2O/(Na_2O + K_2O)$ | 0.5–0.75 |
| $H_2O/(Na_2O + K_2O)$ | 10–35 | more preferably,

| | |
|---|---|
| $Na_2O/(Na_2O + K_2O)$ | 0.5–0.65 |

Outside the above respective ranges of the molar ratios, impurities such as A-type zeolite, natrolite, and P-type zeolite are produced in large amounts, and the pure low-silica zeolite of $SiO_2/Al_2O_3$ ratio of 1.9–2.1 cannot be obtained.

It has been considered generally that the high-purity LSX will not be formed in the above $Na_2O/(Na_2O+K_2O)$ ratio range particularly preferred in the present invention. For example, in this molar ratio range, the ratio of LSX formation is lower than 80% according to the document, Zeolite, 1987, Vol.7, p.453, FIG. 4. Like this, high-purity LSX cannot be produced by a conventional still-standing technique (see Comparative Example 2).

By mixing the source materials in such a manner, amorphous aluminosilicate gel is generally formed during or after the mixing of the source materials.

The LSX production process has been considered to comprise, essentially, the steps of mixing the source material solutions to prepare once a uniform transparent solution of the components, elevating the temperature of the solution, stopping stirring at the time when gelation begins, and leaving the solution standing for aging without supplying mechanical energy. That is, the stirring is stopped when or before the gelation begins, aging is allowed to proceed by still-standing with the entire gel kept uniform, the temperature is elevated and crystallization is allowed to proceed by still-standing to obtain the LSX of the $SiO_2/Al_2O_3$ molar ratio of 1.9–2.1.

However, after comprehensive investigation in consideration of the uniformity of the gel, it has been found by the inventors of the present invention that a novel high-purity heat-resistant LSX can be produced by forming a uniform slurry of the entire gel to bring the gel viscosity within a certain range, for example, by intense stirring. This is completely different from the traditional concept that the setting aside at the final mixing step and the avoidance of excessive mechanical energy supply in the subsequent step are important.

In the present invention, the conditions of mixing and stirring the source materials are essentially selected so as to obtain the viscosity of the resulting slurry in the range of from 10 to 10000 cp. At the slurry viscosity of higher than 10000 cp, the slurry is partly agitated and partly stagnant in the reaction vessel to impair the uniformity of the entire gel, not giving a single-phase LSX undesirably. On the other hand, at the slurry viscosity of lower than 10 cp, the gel comes to be separated by sedimentation in the crystallization step, not giving a single-phase LSX. Accordingly, the gel formed during or after the material mixing is preferably disintegrated and fluidized, for example, by violent stirring to retain the slurry viscosity within the aforementioned range. The stirring may be conducted by any of conventional methods without limitation.

Subsequently, the formed slurry is subjected to aging. The aging temperature ranges preferably from 20° C. to 60° C., but is not limited thereto. Within this aging temperature range, the aging does not take long time, and the impurity formation which may occur at a higher temperature can be prevented. Specifically the aging is conducted at a temperature of from 36° C. to 50° C. for a time of from 4 to 24 hours.

The formed entirely uniform slurry having the viscosity of 10–10000 cp may be aged with stirring. The slurry after reaching the aging temperature may be aged with stirring or without stirring since the entire slurry has become uniform already.

After further investigation, it was found by the inventors of the present invention that the fineness of the formed amorphous aluminosilicate gel particles with a specific surface area of not less than 10 $m^2/g$ even after the aging, and the source material mixing to obtain $SiO_2/Al_2O_3$ molar ratio of 1.9–2.1 are essential for synthesis of low-silica faujasite type zeolite, in addition to the aforementioned maintenance of the slurry viscosity. The fineness and the activeness of the amorphous aluminosilicate formed on mixing the source materials give good effects. The high-purity LSX can be produced by keeping the specific surface area of 10 $m^2/g$ or more after the aging. With a gel having the surface area of less than 10 $m^2/g$, A-type zeolite is inevitably formed as a byproduct in a large amount to prevent the synthesis of high-purity LSX. The upper limit of the specific surface area after the aging is about 60 $m^2/g$.

The yield ratio of LSX is improved by controlling the source material-mixing conditions so as to obtain the amorphous aluminosilicate particle composition approximate to the composition of LSX. In other words, the $SiO2/Al_2O_3$ molar ratio of the amorphous aluminosilicate particle should be in the range of 1.9 to 2.1. Outside this range, A-type zeolite or P-type zeolite is produced inevitably undesirably.

The inventors of the present invention found that the gel of the $SiO_2/Al_2O_3$ molar ratio of 1.9–2.1 having a BET specific surface area of not less than 10 $m^2/g$ after the aging can be produced by mixing an aqueous alkali silicate solution of the $SiO_2/(Na_2O+K_2O)$ molar ratio of less than 1.0 with an aqueous alkali aluminate solution of the $Al_2O_3/(Na_2O+K_2O)$ molar ratio of less than 1.0, with less adverse effects of variation of the mixing conditions. By this method, the LSX can be produced stably without variation in the BET specific surface area or the composition of the amorphous aluminosilicate, independently of slight variation in mixing conditions.

From a mixture of an aqueous alkali silicate solution of the $SiO_2/(Na_2O+K_2O)$ molar ratio of less than 1.0 with an aqueous alkali aluminate solution of the $Al_2O_3/(Na_2O+K_2O)$ molar ratio of less than 1.0, amorphous aluminosilicate can be produced which is composed of extremely fine particles, and has a composition of $SiO_2/Al_2O_3$ molar ratio of 1.9–2.1 and a BET specific surface area of 10 $m^2/g$ or more independently of the temperature and time of the mixing.

At the molar ratio of $SiO_2/(Na_2O+K_2O)$ or $Al_2O_3/(Na_2O+K_2O)$ of not less than 1.0, the surface area and the composition of the formed amorphous aluminosilicate vary greatly, which makes difficult the stable production of fine amorphous aluminosilicate of $SiO_2/Al_2O_3$ molar ratio of 1.9–2.1.

In the next step, the gel after the aging for the prescribed time is subjected to temperature elevation for crystallization.

In industrial large scale production, the gel may be heated with stirring since the heat transfer into the interior of the gel requires long time. In this case, the temperature of the gel is preferably elevated in a possible shortest time to prevent impurity formation, specifically in not longer than three hours, more preferably not longer than one hour.

The method of the temperature elevation of the gel is not limited provided that the gel can be heated to the crystallization temperature in a short time. In an Example, the gelation-aging is conducted in a vessel, and crystallization is conducted in another vessel, and the gel is transported from gelation-aging vessel to the crystallization vessel by a pump or the like through a heat exchanger for heating.

The crystallization is preferably conducted in stationary state without stirring to prevent impurity formation. The crystallization temperature is preferably in the range of from about 60° C. to about 90° C. to shorten the crystallization time and to prevent impurity formation at a higher temperature.

The time for the crystallization depends on the crystallization temperature, and usually ranges from 4 to 12 hours in the present invention. A longer time is acceptable. When the crystallization time is shorter, the crystallization can be incomplete to leave amorphous aluminosilicate uncrystallized.

The LSX of $SiO_2/Al_2O_3$ molar ratio of 1.9–2.1 having synthesized as above is collected by filtration, washed, and dried. The filtration, washing, and drying can be conducted by conventional methods.

The present invention makes practicable the production of the LSX of $SiO_2/Al_2O_3$ molar ratio of 1.9–2.1 without cooling of the source material mixture and with aging under stirring, making feasible the industrial production of the novel heat-resistant LSX.

The LSX of the present invention has the thermal characteristics and the application fields as described below.

The novel LSX of the present invention retains the heat resistance even after exchange with another ion, and the heat resistance is much higher than conventional LSXs, surprisingly.

For example, LSX derived by exchanging the LSX as the base zeolite of the present invention with lithium ion and/or alkaline earth metal ion has extremely high performance in adsorption separation of a more polar gas component in a gas mixture.

The exchange ratio of the LSX of the present invention with lithium can be in the range of from 75% to 100%, or preferably from 75% to 88%. Although the higher lithium exchange ratio gives higher performance, the production cost will be high owing to expensiveness of lithium.

The exchange ratio of the LSX with alkaline earth metal cation is preferably ranges from 40% to 75% in the present invention.

The lithium-exchanged LSXs and the alkaline earth metal-exchanged LSXs are novel substances having excellent heat resistance, and are different from the low-silica zeolites or LSXs disclosed in U.S. Pat. Nos. 3,140,933, 4,859,217, 5,268,023, 3,140,932, 5,173,462, 5,454,857, and JP-A-61-25424.

The ion exchange of the LSX of the present invention with lithium ion or alkaline earth metal ion can be conducted by a conventional process without employing a special procedure, although it is completely different from conventional LSXs in thermal characteristics.

The thermal characteristics of the zeolite are evaluated conventionally by differential thermal analysis (DTA) as described in U.S. Pat. No 5,174,979, JP-A-7-256094, and so forth.

The thermal decomposition temperature in the present invention is defined as the peak top temperature (first thermal decomposition temperature) of the lowest temperature detectable by DTA. By this generally accepted evaluation method, the novel LSX of the present invention and the ion-exchanged products have higher heat resistance than the conventional LSX and ion-exchanged product under the same ion exchange conditions. The thermal decomposition temperature of the LSX of the present invention is in the range of from 870° C. to 900° C., and is higher by at least 5° C., generally 10° C. than that of conventional LSXs. The thermal decomposition temperature of the ion-exchanged LSX of the present invention also is higher than that of the corresponding conventional ion-exchanged LSX by about 10° C.

The purity of the LSX of the present invention is preferably 95% or higher, more preferably 100% (single phase). The purity of LSX is evaluated mainly by X-ray crystal structure analysis, and is represented by the ratio of the diffraction peak of impurities to that of the LSX. The content of the impurities can be cross-checked by decrease of water adsorption relative to the single phase LSX.

The adsorbent employing the novel LSX of the present invention as the base zeolite adsorbs a relatively polar gas from a gas mixture, and is useful for separation and purification of gases, such as production of high-purity oxygen by adsorption of nitrogen from the air, and removal of harmful carbon monoxide from a combustion gas. The adsorbent is especially useful in pressure-swing adsorption (PSA) for separation of oxygen in high purity by adsorption of nitrogen from air, and recovery, or removal of $CO_2$ gas.

The present invention is described below in more detail by reference to Examples and Comparative Examples without limiting the invention.

The measurements were conducted as below in Examples and Comparative Examples.

(1) Chemical Constitution

The sample was dissolved by nitric acid-hydrofluoric acid. The chemical constitution was measured with this solution by ICP emission spectrochemical analyzer (model: Optima 3000, Perkin Elmer Co.).

(2) Crystal Structure

The crystal structure was measured by an X-ray diffraction analyzer (model: MXP-3, MacScience Co.).

(3) Moisture Equilibrium Adsorption Capacity

A powdery sample dried at 100° C. was left in a desiccator at a relative humidity of 80% for 16 hours or longer, and the sample was heated at 900° C. for one hour to measure the decrease of the weight.

(4) Viscosity

The viscosity was measured by B-type viscometer (manufactured by Tokimekku K.K.) according to JIS-K-7117 (issued on 1987).

(5) BET Specific Surface Area

The BET specific surface area was measured by the apparatus, Flowsorb II 2300 (Micromeritics Co.).

(6) Thermal Characteristics by DTA-TG

The thermal characteristics was evaluated by differential thermal analysis, which is generally employed for heat resistance evaluation of zeolite, with a differential thermal balance, Thermoflex, Model 8100 (Rigaku Denki K.K.) in the air at a temperature elevation rate of 10° C./min up to 1000° C. at an air flow rate of 50 mL/min.

(7) Air Separation Characteristics

The ion-exchanged LSX prepared according to the present invention was evaluated for stationary saturation adsorption (isotherm) of nitrogen and oxygen by weight. From the measurement, the air separation property was represented by the separation coefficient at 0.4 kg/cm², the pressure adopted generally as the adsorption pressure in the industrial pressure swing adsorption process. The separation coefficient is derived according to the formula (1):

$$\text{Separation coefficient} = \frac{\text{Nitrogen absorption volume}}{\text{Oxygen absorption volume}} \times \frac{\text{Oxygen partial pressure}}{\text{Nitrogen partial pressure}} \quad (1)$$

The adsorption pressure conditions for PSA generally employed were decided in consideration of the average of the data shown in JP-A-8-71350, JP-A-8-239204.

EXAMPLE 1

In a 3-liter stainless steel reaction vessel, were placed 453 g of aqueous sodium aluminate solution ($Na_2O$: 20.0 wt %, $Al_2O_3$: 22.5 wt %, $Al_2O_3/Na_2O$: 0.68 (molar ratio)), 1060 g of water, 181 g of sodium hydroxide (purity: 99%), and 343 g of potassium hydroxide (first-grade reagent, purity: 85%). The content in the vessel was stirred at 250 rpm at a temperature of 36° C. on a water bath. To this solution, was added 833 g of aqueous sodium silicate solution ($Na_2O$: 3.8 wt %, $SiO_2$: 12.6 wt %, $SiO_2/Na_2O$: 3.4 (molar ratio)) in 5 minutes and 50 seconds. Three minutes after the start of the addition of the silicate solution, the mixture became turbid and began to gel. During the addition of the sodium silicate solution, the viscosity of the gel rose as a whole, but no local gel stagnation occurred in the reaction vessel. At the end of the addition, the slurry temperature was 38° C., and the viscosity thereof was 320 cp. The gel was aged at 36° C. for 16 hours with continuous stirring. After the aging, a sample was taken out from the slurry. The solid matter in the sample was collected by filtration, washed, and analyzed. The specific surface area was 20 m²/g, and the $SiO_2/Al_2O_3$ molar ratio was 1.98. The gel slurry after the aging was transported by means of a roller pump through a stainless steel spiral heat exchanger (8 mm diameter) immersed in an oil bath kept at 80° C. for heating into a 3-liter stainless steel crystallization vessel. The temperature of the gel at the inlet of the crystallization vessel was 70° C. The transportation of the gel slurry with heating was completed in 20 minutes. Then the crystallization vessel containing the gel slurry was covered, and was placed in a air dryer kept at 70° C. for 8 hours for crystallization. The resulting crystalline matter was washed with pure water sufficiently and was dried at 100° C. overnight.

The obtained powdery crystal was found to be a single-phase faujasite type zeolite by X-ray diffraction analysis, having a chemical constitution of $0.67Na_2O.0.33K_2O.Al_2O_3.2.0SiO_2$ and exhibiting moisture equilibrium adsorption of 33.4%. The experimental conditions and the results are shown in Table 1.

EXAMPLE 2

The experiment was conducted in the same manner as in Example 1 except that the aging temperature was raised to 50° C., and the aging time was shortened to 8 hours because of the higher aging temperature. At the end of the aging, the viscosity was 240 cp, and the BET specific surface area was 24 m²/g. The gel was dried at 100° C. overnight.

The obtained powdery crystal was found to be a single-phase faujasite type zeolite by X-ray diffraction analysis, having a chemical constitution of $0.67Na_2O.0.33K_2O.Al_2O_3.2.0SiO_2$ and exhibiting moisture equilibrium adsorption of 33.2%. The experimental conditions and the results are shown in Table 1.

EXAMPLE 3

In a 3-liter stainless steel reaction vessel, were placed 833 g of aqueous sodium silicate solution used in Example 1, 1060 g of water, 37.4 g of sodium hydroxide (purity 99%), and 540 g of potassium hydroxide (first grade reagent, purity: 85%), which are the same as the reagents in Example 1. The content in the vessel was stirred at 250 rpm, kept at a temperature of 10° C. on a water bath. To this solution, 453 g of aqueous sodium aluminate solution as used in Example 1 and kept at 10° C. was added in 5 minutes and 30 seconds. Immediately after the start of the addition of the aluminate solution, the mixture became turbid and began to gel. During the addition of the sodium aluminate solution, the viscosity of the gel rises as a whole, but no local gel stagnation occurred in the reaction vessel. At the end of the addition, the slurry temperature was 16° C., and the viscosity thereof was 180 cp. The gel was aged at 36° C. for 16 hours with continuous stirring. After the aging, a sample was taken out from the slurry. The sample was filtered, washed, and analyzed. The specific surface area was 22 m²/g, and the $SiO_2/Al_2O_3$ molar ratio was 2.04. The gel slurry after the aging was transported with heating, crystallized washed and dried in the same manner as in Example 1.

The obtained powdery crystal was found to be a single-phase faujasite type zeolite by X-ray diffraction analysis, having a chemical constitution of $0.61Na_2O.0.39K_2O.Al_2O_3.2.0SiO_2$ and exhibiting moisture equilibrium adsorption of 33.4%. The experimental conditions and the results are shown in Table 1.

EXAMPLE 4

The source material composition was the same as in Example 1. A scale-up test was conducted with a reaction vessel of 30 m³ (scale-up factor: 10,000). The source materials were introduced into the reaction vessel with stirring. At the end of introduction of the source materials, the slurry temperature was 45° C., and the slurry viscosity was 300 cp. The slurry was further stirred continuously for aging at 45° C. for 12 hours. After the aging, a sample was taken out, and solid matter was collected by filtration, washed, and analyzed. The gel had a specific surface area of 25 m²/g, and the molar ratio $SiO_2/Al_2O_3$ of the gel was 2.02. The gel slurry after the aging was transported through a pipe to a separate 30 m³-crystallization vessel. During the slurry transportation, high temperature steam was introduced into the transporting pipe to heat the gel slurry. The gel slurry temperature in the crystallization vessel was 70° C. The transportation and heating was conducted in 30 minutes. After the completion of transportation and heating, crystallization was allowed to proceed by still-standing without stirring for 8 hours.

The resulting crystalline matter was washed with water, and dried at 100° C. The obtained powdery crystal was found to be composed of a faujasite type zeolite at a purity of 99% by X-ray diffraction analysis, having a chemical constitution of $0.68Na_2O.0.32K_2O.Al_2O_3.2.0SiO_2$ and exhibiting moisture equilibrium adsorption of 33.1%. The one batch produced 2.4 tons of LSX in about one day. The experimental conditions and the results are shown in Table 1.

Thus the process of the present invention was confirmed to be capable of producing a large amount of high-purity LSX in one batch industrially.

EXAMPLE 5

In a 3-liter stainless steel reaction vessel, were placed 453 g of aqueous sodium aluminate solution ($Na_2O$: 20.0 wt %, $Al_2O_3$: 22.5 wt %, $Al_2O_3/Na_2O$: 0.68 (molar ratio)), 923 g of water, 235 g of sodium hydroxide (purity: 99%), and 215 g of potassium hydroxide (first-grade reagent, purity: 85%). The content in the vessel was stirred at 90 rpm with cooling on an ice water bath (about 2° C.).

To this solution, was added 833 g of aqueous sodium silicate solution ($Na_2O$: 3.8 wt %, $SiO_2$: 12.6 wt %, $SiO_2/Na_2O$: 3.4 (molar ratio)) and 137 g of water, both being cooled with ice, in a time of 5 minutes. The solution after the addition of the sodium silicate was translucent. After stirring for further 20 minutes, the temperature of the water bath was elevated to 36° C. When the solution temperature reached 25° C., the solution began to gel with white turbidity. At that time the stirring was intensified to 250 rpm. Although the viscosity of the gel rose as a whole, no local gel stagnation occurred in the reaction vessel. The viscosity of the gel was 120 cp. The gel was aged at 36° C. for 48 hours with continuous-stirring. The gel slurry after the aging was transported by means of a roller pump with heating through a stainless steel spiral heat exchanger (8 mm diameter) immersed in an oil bath kept at 80° C. into a 3-liter stainless steel crystallization vessel. The temperature of the gel at the inlet of the crystallization vessel was 70° C. The transportation of the gel slurry with heating was completed in 20 minutes.

Then the crystallization vessel containing the gel slurry was covered, and was placed in a air dryer kept at 70° C. for 16 hours for crystallization. The resulting crystalline matter was washed with pure water sufficiently and was dried at 100° C. overnight. The obtained powdery crystal was found to be a single-phase faujasite type zeolite by X-ray diffraction analysis, having a chemical constitution of $0.76Na_2O.0.24K_2O.Al_2O_3.2.0SiO_2$ and exhibiting moisture equilibrium adsorption of 33.1%. The zeolite in which the entire of the potassium was replaced by sodium exhibited moisture equilibrium adsorption of 35.4%. The experimental conditions and the results are shown in Table 1.

As shown in this example, the LSX can be produced stably with out formation of impurities, even when the aging time or the crystallization are lengthened.

EXAMPLE 6

In a 3-liter stainless steel reaction vessel, were placed 453 g of aqueous sodium aluminate solution ($Na_2O$: 20.0 wt %, $Al_2O_3$: 22.5 wt %, $Al_2O_3/Na_2O$: 0.68 (molar ratio)), 1060 g of water, 235 g of sodium hydroxide (purity: 99%), and 215 g of potassium hydroxide (first-grade reagent, purity: 85%). The content in the vessel was stirred at 250 rpm at a temperature of 36° C. on a water bath. To this solution, was added 833 g of aqueous sodium silicate solution ($Na_2O$: 3.8 wt %, $SiO_2$: 12.6 wt %, $SiO_2/Na_2O$: 3.4 (molar ratio)) in 5 minutes and 50 seconds. Three minutes after the start of the addition of the silicate solution, the mixture became turbid and began to gel. During the addition of the sodium silicate solution, the viscosity of the gel rose as a whole, but no local gel stagnation occurred in the reaction vessel. At the end of the addition, the slurry temperature was 38° C., and the viscosity thereof was 320 cp. The gel was aged at 38° C. for 24 hours with continuous stirring. After the aging, a sample was taken out from the slurry. The solid matter in the sample was collected by filtration, washed, and analyzed. The specific surface area was 20 m²/g, and the $SiO_2/Al_2O_3$ molar ratio was 1.98. The gel slurry after the aging was transported by means of a roller pump with heating through a stainless steel spiral heat exchanger (8 mm diameter) immersed in an oil bath kept at 80° C. for heating into a 3-liter stainless steel crystallization vessel. The temperature of the gel at the inlet of the crystallization vessel was 70° C. The transportation of the gel slurry with heating was completed in 20 minutes. Then the crystallization vessel containing the gel slurry was covered, and was placed in a air dryer kept at 70° C. for 8 hours for crystallization. The resulting crystalline matter was washed with pure water sufficiently and was dried at 100° C. overnight.

The obtained powdery crystal was found to be a single-phase faujasite type zeolite by X-ray diffraction analysis, having a chemical constitution of $0.76Na_2O.0.24K_2O.Al_2O_3.2.0SiO_2$ and exhibiting moisture equilibrium adsorption of 33.4%. The experimental conditions and the results are shown in Table 1.

Comparative Example 1

In the manner disclosed in USP 4,859,217 (JP-A-5-25527), 83.3 g of an aqueous sodium silicate solution ($Na_2O$: 3.8 wt %, $SiO_2$: 12.6 wt %), 106 g of water, 23.5 g of sodium hydroxide (purity: 99%), and 21.5 g of potassium hydroxide (first-grade reagent, purity: 85%) were placed in a 0.5-liter stainless steel reaction vessel. The content in the vessel was stirred at 250 rpm at a temperature of 5° C. on an ice bath. The $SiO_2/(Na_2O+K_2O)$ molar ratio in the aqueous solution was 0.33. To this solution, was added 45.3 g of aqueous sodium aluminate solution ($Na_2O$: 20.0 wt %, $Al_2O_3$: 22.5 wt %, $Al_2O_3/Na_2O$: 0.68 (molar ratio)) kept at 5° C. in 2 minutes and 50 seconds. At the end of the addition, the mixture was a translucent solution. This solution was left standing at 5° C., whereby the solution came gradually to be in a state of custard pudding, and became complete solid in 5 minutes.

The pudding-like mass was sealed in the vessel, and was aged at 36° C. for 48 hours in a thermostated drier, and then crystallized at 70° C. for 16 hours. At the end of the aging, a sample was taken out from the slurry. The solid matter in the sample was collected by filtration, washed, and analyzed. The specific surface area was 60 m$^2$/g, and the SiO$_2$/Al$_2$O$_3$ molar ratio was 2.02. The aged matter was transported, heated, crystallized, washed, and dried in the same manner as is Example 1.

The obtained powdery crystal was found to be composed of faujasite type zeolite at a purity of 99% by X-ray diffraction analysis, having a chemical constitution of 0.72Na$_2$O.0.28K$_2$O.Al$_2$O$_3$.2.0SiO$_2$ and exhibiting moisture equilibrium adsorption of 33.1%. The experimental conditions and the results are shown in Table 1.

Comparative Example 2

Scale-up of the process of Comparative Example 1 was tried by use of a jacketed 500-liter reactor under the same conditions. The temperature elevation of the formed gel was tried from the gel preparation temperature, 5° C., to the aging temperature, 36° C., by elevating the jacket temperature. Even after 12 hours, the temperature of the interior gel portion was not higher than 25° C., although the temperature of the gel portion near the reactor wall was 36° C. After 48 hours, the temperature of the center portion was not higher than 30° C.

After 48 hours, the jacket temperature was further elevated to 80° C. However, after 8 hours, the temperature at the center portion was not higher than 40° C., although the temperature of the portion near the reactor wall was 70° C.

The reaction product obtained with such temperature distribution was evaluated by X-ray diffraction. The product at the central portion was an unstable gel of uncompleted reaction, and the product on the wall of the reaction vessel was a mixture of impure A-type zeolite and other impurities with little formation of the low-silica faujasite type zeolite.

Thus, uniformity of the reaction system was found to be essential for synthesis of the high-purity LSX, and application of mechanical energy by stirring is essential in larger scale production.

Comparative Example 3

In the manner as described in Zeolite, 1987, vol.7, p.451., the material composition of Example 3 was aged by still standing at 50° C. for 24 hour, and was crystallized at 100° C. for 3 hours by still-standing.

At the end of the aging, a sample was taken out from the slurry. The solid matter in the sample was collected by filtration, washed, and analyzed. The specific surface area was 70 m$^2$/g, and the SiO$_2$/Al$_2$O$_3$ molar ratio was 2.02. The aged matter was transported, heated, crystallized, washed, and dried in the same manner as in Example 1.

The obtained powdery crystal was found to be in a mixed phase state composed of a small amount of an LSX phase and a large amount of impurities by X-ray diffraction analysis, and to exhibit moisture equilibrium adsorption of 19.0%. The experimental conditions and the results are shown in Table 1.

The above method did not produce LSX as described in the literature (Zeolite 1987 Vol.7 P.451).

EXAMPLES 7~8 and COMPARATIVE EXAMPLES 4~5

Powdery materials were prepared from the powdery LSXs of Example 4 and Comparative Example 1 by exchanging the LSX with lithium at an exchange ratio of 99%, or with calcium at an exchange ratio of 60%. The powdery LSXs of Example 4 and Comparative Example 1, the two lithium-exchanged LSXs, and two calcium-exchanged LSXs were hydrated in an atmosphere of the relative humidity of 80%. The powdery LSXs were subjected to differential thermal analysis in the air in the range of from room temperature to 100° C. under the conditions of the temperature elevation rate of 10° C./min and the air flow rate of 50 mL/min.

The results are shown in Table 1.

The powdery LSXs of the present invention has a thermal decomposition temperature higher than that of conventional LSXs, and this effect is retained after ion exchange with lithium or an alkaline earth metal ion.

EXAMPLE 9

An LSX obtained in Example 1 as the base material was exchanged with lithium at an exchange ratio of 99%. Separately, another ion-exchanged LSX having heat resistance was prepared by ion-exchange of a conventional LSX with lithium ion and calcium ion (lithium: 87%, and calcium: 13%) according to the method disclosed in U.S. Pat. No. 5,174,979. The two ion-exchanged LSXs were tested for air separation characteristics (separation coefficient).

The ion-exchanged LSX of the prior art had exhibited lower performance, especially at lower temperatures.

TABLE 1

| Example No. | Slurry preparation Temperature (°C) | Mixing time (min:sec) | Aging Temperature (°C) | Time (hr) | Viscosity (cp) | Stirring | Crystallization Temperature (°C) | time (hr) | Amorphous aluminosilicate Gel BET surface area (m²/g) | $SiO_2/Al_2O_3$ (molar ratio) | Powdery crystal X-ray diffraction | Equilibrium moisture adsorption (%) | Exchanging cation Na | K | Li | Ca | Thermal decomposition temp.* (°C) |
|---|---|---|---|---|---|---|---|---|---|---|---|---|---|---|---|---|---|
| Example |
| 1 | 38 | 5:50 | 36 | 16 | 320 | Stirred | 70 | 8 | 20 | 1.98 | Single phase | 33.4 | 67 | 33 | — | — | 877 |
| 2 | 38 | 5:50 | 50 | 8 | 240 | Stirred | 70 | 8 | 24 | 2.02 | Single phase | 33.2 | 67 | 33 | — | — | 876 |
| 3 | 10 | 5:30 | 36 | 16 | 180 | Stirred | 70 | 8 | 22 | 2.04 | Single phase | 33.4 | 61 | 39 | — | — | 877 |
| 4 | 45 | 5:00 | 45 | 12 | 300 | Stirred | 70 | 8 | 25 | 2.02 | Single phase | 33.3 | 67 | 33 | — | — | 877 |
| 5 | 2 | 5:00 | 36 | 48 | 120 | Stirred | 70 | 16 | 40 | 1.98 | Single phase | 33.1 | 76 | 24 | — | — | — |
| 6 | 36 | 5:50 | 38 | 24 | 320 | Stirred | 70 | 8 | 20 | 1.98 | Single phase | 33.4 | 76 | 24 | — | — | — |
| 7 | 45 | 5:00 | 45 | 12 | 300 | Stirred | 70 | 8 | — | — | — | — | 1 | — | 99 | — | 746 |
| 8 | 45 | 5:00 | 45 | 12 | 300 | Stirred | 70 | 8 | — | — | — | — | 35 | 5 | — | 60 | 900 |
| Comparative Example |
| 1 | 5 | 2:50 | 36 | 48 | Unmeasurable | None | 70 | 16 | 65 | 2.02 | Single phase | 33.1 | 72 | 28 | — | — | 865 |
| 2 | 5 | 2:50 | 36 | 48 | Unmeasurable | None | 70 | 16 | 65 | — | Mixed phase | — | 72 | 28 | — | — | — |
| 3 | 5 | 5:00 | 50 | 24 | Unmeasurable | None | 100 | 3 | 80 | — | Mixture | 19.8 | — | — | — | — | — |
| 4 | 5 | 2:50 | 36 | 48 | Unmeasurable | None | 70 | 16 | — | — | — | — | 1 | — | 99 | — | 737 |
| 5 | 5 | 2:50 | 36 | 40 | Unmeasurable | None | 70 | 16 | — | — | — | — | 35 | 5 | — | 60 | 892 |

*First thermal decomposition, center temperature

What is claimed is:

1. A heat-resistant low-silica zeolite of a molar ratio of $SiO_2/Al_2O_3$ ranging from 1.9 to 2.1 having sodium and/or potassium as a metal cation, wherein the low-silica zeolite contains low-silica faujasite type zeolite at a content of not lower than 88%, and has a thermal decomposition temperature ranging from 870° C. to 900° C. in the air.

2. The heat-resistant low-silica zeolite according to claim 1, wherein the low-silica zeolite contains the low-silica faujasite type zeolite at a content of not lower than 95%.

3. A process for producing the heat-resistant low-silica zeolite as set forth in claim 1, comprising mixing a solution containing an aluminate with another solution containing a silicate, allowing the resulting mixture to gel, and aging the formed gel, at a temperature of from 0° C. to 60° C., to prepare a slurry having a viscosity ranging from 10 to 10000 cp and containing amorphous aluminosilicate having a specific surface area of not less than 10 $m^2/g$ with an $SiO_2/Al_2O_3$ molar ratio ranging from 1.9 to 2.1; and subsequently crystallizing the amorphous aluminosilicate.

4. The process for producing the heat-resistant low-silica zeolite according to claim 3, wherein an aqueous alkali silicate solution of an $SiO_2/(Na_2O+K_2O)$ molar ratio of lower than 1.0, and an aqueous alkali aluminate solution of an $Al_2O_3/(Na_2O+K_2O)$ molar ratio of lower than 1.0 are mixed.

5. The process for producing the above heat-resistant low-silica zeolite according to claim 3, wherein the $Na_2O/(Na_2O+K_2O)$ molar ratio of the mixed solution is not less than 0.50, but less than 0.75.

6. The process for producing the heat-resistant low-silica zeolite according to claim 5, wherein the $Na_2O/(Na_2O+K_2O)$ molar ratio is not less than 0.50, but less than 0.65.

7. A lithium ion-exchanged low-silica zeolite for gas separation, derived by exchanging the heat-resistant low-silica zeolite as set forth in claim 1 with lithium ion at a lithium exchange ratio ranging from 75% to 100%.

8. The lithium ion-exchanged low-silica zeolite for gas separation according to claim 7, wherein the lithium exchange ratio ranges from 75% to 88%.

9. An alkaline earth metal ion-exchanged low-silica zeolite for gas separation, derived by exchanging the heat-resistant low-silica zeolite as set forth in claim 1 with an alkaline earth metal ion at an alkaline earth metal exchange ratio ranging from 40% to 75%.

10. A process of producing high purity oxygen comprising contacting air with the low-silica zeolite of claim 7 under conditions sufficient to adsorb nitrogen onto the low silica zeolite.

* * * * *